United States Patent
Wentink et al.

(10) Patent No.: US 8,274,903 B2
(45) Date of Patent: Sep. 25, 2012

(54) METHODS AND APPARATUS FOR SWITCHING BETWEEN A BASE CHANNEL AND A 60 GHZ CHANNEL

(75) Inventors: Maarten Menzo Wentink, Naarden (NL); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 12/539,313

(22) Filed: Aug. 11, 2009

(65) Prior Publication Data
US 2010/0046455 A1    Feb. 25, 2010

Related U.S. Application Data

(60) Provisional application No. 61/090,334, filed on Aug. 20, 2008.

(51) Int. Cl.
*H04J 1/16* (2006.01)
*H04L 12/56* (2006.01)

(52) U.S. Cl. ........ 370/248; 370/252; 370/278; 370/329; 370/430

(58) Field of Classification Search .................. 370/252, 370/278, 329, 430, 248
See application file for complete search history.

(56) References Cited

U.S. PATENT DOCUMENTS

| 6,697,013 B2 * | 2/2004 | McFarland et al. ........... 342/159 |
| 2004/0215769 A1 | 10/2004 | Yoshida et al. |
| 2008/0151845 A1 | 6/2008 | Jaakkola et al. |
| 2008/0177886 A1 * | 7/2008 | Singh et al. .................... 709/228 |
| 2010/0014502 A1 * | 1/2010 | Singh et al. .................... 370/343 |

FOREIGN PATENT DOCUMENTS

| EP | 1947883 | 7/2008 |
| GB | 2364620 | 1/2002 |
| WO | WO2005089249 A2 | 9/2005 |

OTHER PUBLICATIONS

Frech E A et al: "Cellular models and hand-off criteria"; 19890501-19890503, May 1, 1989 , pp. 128-135, XP010086243.
International Search Report and Written Opinion—PCT/US2009/054498, International Search Authority—European Patent Office—Feb. 18, 2010.
Jing Wang et al: "Solving the Incertitude of Vertical Handovers in Heterogeneous Mobile Wireless Network Using MDP" Communications, 2008. ICC '08. IEEE International Conference on, IEEE, Piscataway, NJ, USA, May 19, 2008, pp. 2187-2192, XP031265739 ISBN: 978-1-4244-2075-9.
Minyoung Park et al: "Millimeter-wave multi-Gigabit WLAN: Challenges and feasibility" Personal, Indoor and Mobile Radio Communications, 2008. PIMRC 2008. IEEE 19th International Symposium on, IEEE,Piscataway, NJ, USA, Sep. 15, 2008, pp. 1-5, XP031371756 ISBN: 978-1-4244-2643-0 the whole document.
Vaios A et al: "A dual-band hiperLAN/2-based architecture for indoor hotspot applications" Wireless Ad-Hoc Networks, 2004 International Workshop on Oulu, Finland May 31-Jun. 3, 2004, Piscataway, NJ, USA,IEEE, May 31, 2004, pp. 6-1 0, XP010846671 ISBN: 978-0-7803-8275-6.

* cited by examiner

*Primary Examiner* — John Pezzlo
(74) *Attorney, Agent, or Firm* — Kevin T. Cheatham

(57) ABSTRACT

A method for switching between channels on different bands is described. Communication with a wireless device occurs on a base channel. A channel switch request is sent to the wireless device. An acknowledgment is received from the wireless device. Communication with the wireless device switches to a 60 GHz channel.

71 Claims, 16 Drawing Sheets

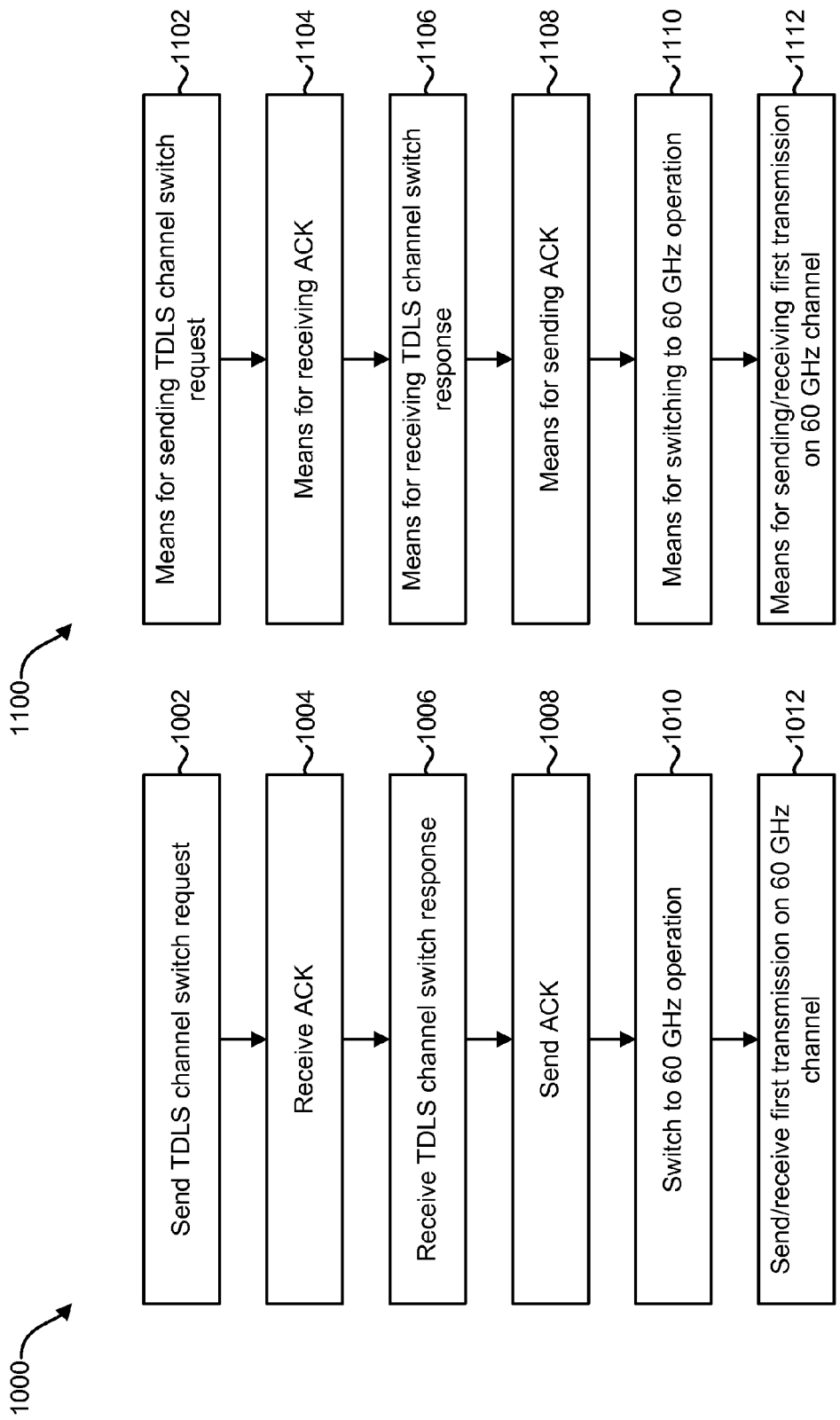

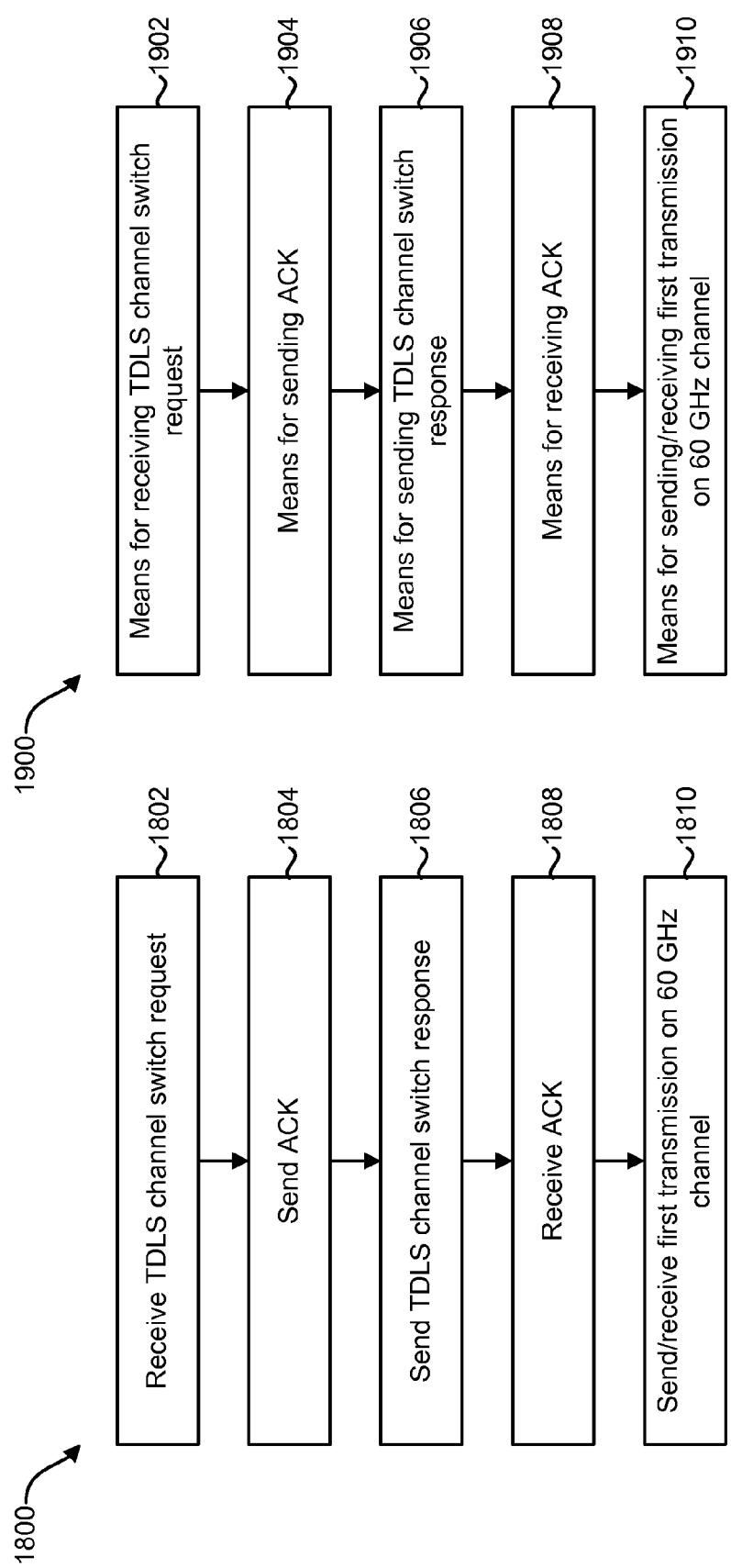

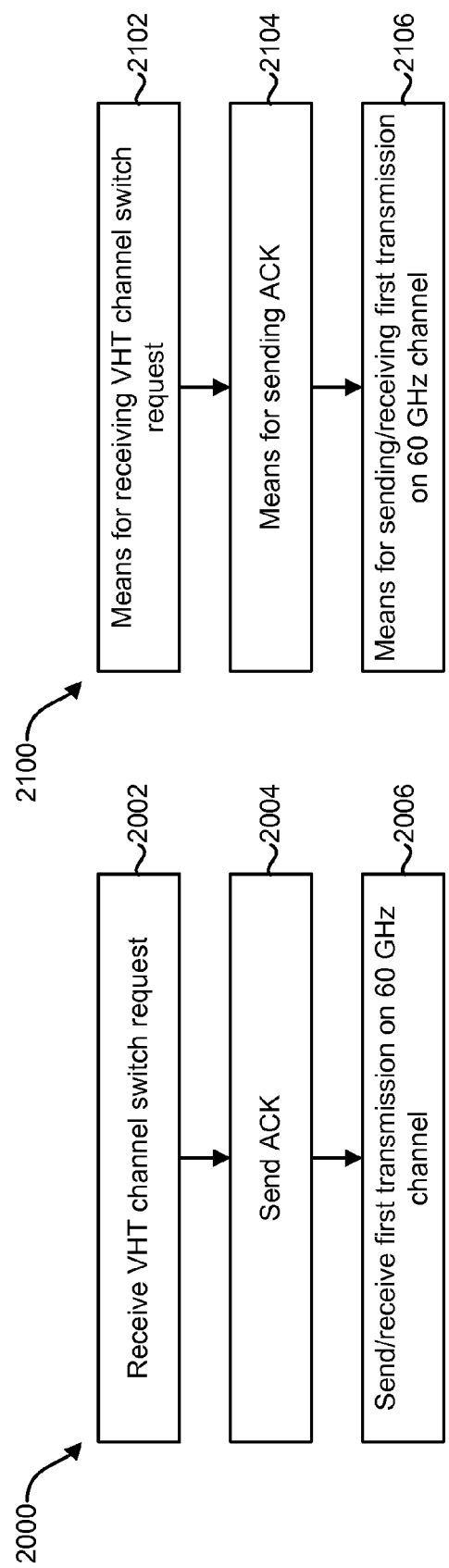

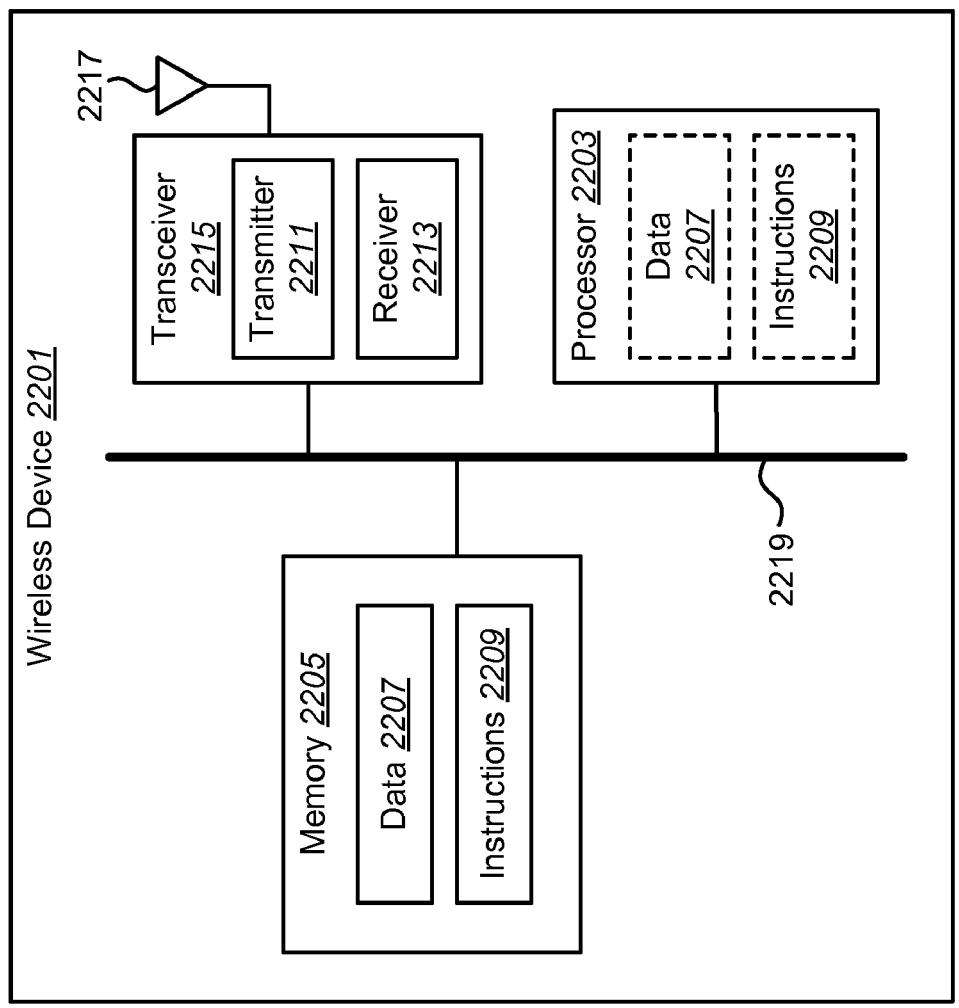

US 8,274,903 B2

METHODS AND APPARATUS FOR SWITCHING BETWEEN A BASE CHANNEL AND A 60 GHZ CHANNEL

RELATED APPLICATIONS

This application claims the benefit of U.S. Provisional Patent Application Ser. No. 61/090,334, titled "Systems and Methods for Switching Between a Base Channel and a 60 GHz Channel", which was filed Aug. 20, 2008, which is expressly incorporated herein by this reference.

TECHNICAL FIELD

The present disclosure relates generally to wireless communication systems. More specifically, the present disclosure relates to methods and apparatus for switching between a base channel and a 60 GHz channel.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, a subscriber station, an access terminal, a remote station, a user terminal, a terminal, a subscriber unit, user equipment, etc. The term "subscriber station" will be used herein.

A wireless communication system may provide communication for a number of cells, each of which may be serviced by a base station. A base station may be a fixed station that communicates with mobile stations. A base station may alternatively be referred to as an access point, a Node B, or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station. A wireless communication system may simultaneously support communication for multiple subscriber stations.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA).

BRIEF DESCRIPTION OF THE DRAWINGS

FIG. 10 is a flow diagram illustrating a method for a subscriber station STA 1 to trigger a switch from communicating with a subscriber station STA 2 on the base channel to communicating with STA 2 on the 60 GHz channel using a TLDS channel switch request;

FIG. 11 illustrates means-plus-function blocks corresponding to the method of FIG. 10;

FIG. 18 is a flow diagram illustrating a method for an access point AP to be triggered by a subscriber station STA to switch from communicating with the STA on the base channel to communicating with the STA on the 60 GHz channel using a TDLS channel switch request;

FIG. 19 illustrates means-plus-function blocks corresponding to the method of FIG. 18;

FIG. 20 is a flow diagram illustrating a method for an access point AP to be triggered by a subscriber station STA to switch from communicating with the STA on the base channel to communicating with the STA on the 60 GHz channel using a VHT channel switch request;

FIG. 21 illustrates means-plus-function blocks corresponding to the method of FIG. 20; and FIG. 22 illustrates various components that may be utilized in a wireless device.

DETAILED DESCRIPTION

Figure 1:
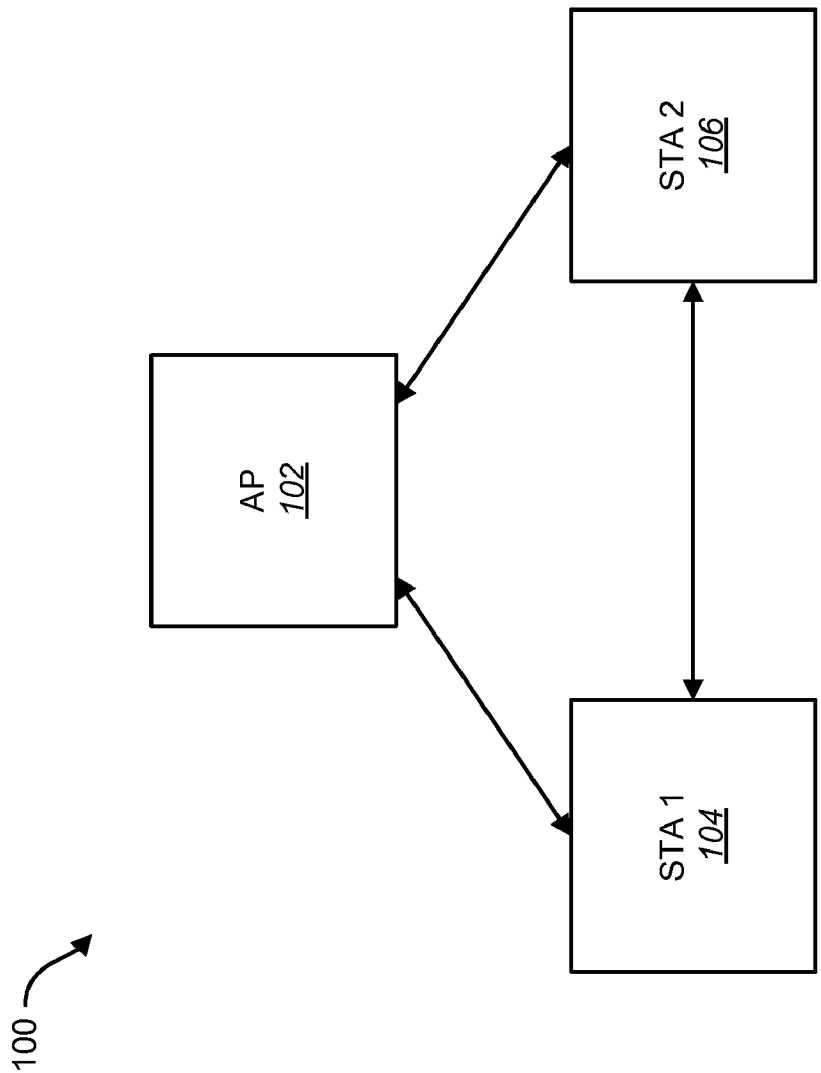
FIG. 1 illustrates a system including an access point (AP) in wireless electronic communication with multiple subscriber stations (STA) on either a base channel or a 60 GHz channel.

A method for switching between channels on different bands is described. The method may include communicating with a wireless device on a base channel. A channel switch request may be sent to the wireless device. An acknowledgment may be received from the wireless device. The method may also include switching to a 60 GHz channel for communicating with the wireless device.

The wireless device may be an access point (AP). The wireless device may be a subscriber station (STA). The method may be performed by an AP. The method may also be performed by a subscriber station (STA). Switching to communicating on the 60 GHz channel may be triggered by an access point (AP). Switching to communicating on the 60 GHz channel may also be triggered by a subscriber station (STA).

The method may include switching back to the base channel if the 60 GHz channel fails. The method may also include switching back to the base channel based on physical layer (PHY) metrics of the 60 GHz channel. The method may further include switching back to the base channel if a successful frame exchange has not occurred on the 60 GHz channel within a predefined window. A test frame may be sent on the 60 GHz channel to determine channel characteristics of the 60 GHz channel before switching to the 60 GHz channel. Data may be sent to the wireless device on the 60 GHz channel. The base channel may be an 802.11 WLAN operating at 2.4 GHz. Alternatively, the base channel may be an 802.11 WLAN operating at 5 GHz.

The channel switch request may include a tunneled direct link setup (TDLS) channel switch response. The channel switch request may include a very high throughput (VHT) channel switch request. Data may be received from the wireless device on the 60 GHz channel. A channel switch response may be received from the wireless device. An acknowledgment acknowledging receipt of the channel switch response may be sent to the wireless device.

The method may further include waiting at least a switch time before communicating with a subscriber station on the 60 GHz channel, wherein the switch time is a predefined time period for switching to occur. The method may also include switching back to the base channel when no communication starts on the 60 GHz channel within a predefined time period after the switch time. The method may further include waiting at least a switch time before sending a hello frame to the subscriber station on the 60 GHz channel, wherein the switch time is a predefined time period for switching to occur. The method may also include waiting a switch time, a probe time, and a backoff time before communicating with an access point (AP).

A physical layer (PHY) signal may be sent when a bad connection is detected with the wireless device. The method may also include communicating on the base channel and on the 60 GHz channel simultaneously. The method may include switching back to communicating with the wireless device on the base channel if a continuation frame is received from the wireless device on the base channel.

A method for switching between channels on different bands is also described. The method may include communicating with a wireless device on a base channel. A channel switch request may be received from the wireless device. An acknowledgment may be sent to the wireless device. A channel switch response frame may also be sent to the wireless device. An acknowledgment may be received from the wireless device. The method may also include switching to a 60 GHz channel for communicating with the wireless device.

The wireless device may be an access point (AP). The wireless device may also be a subscriber station (STA). The method may be performed by an access point (AP). Alternatively, the method may be performed by a subscriber station (STA). Switching to communicating on the 60 GHz channel may be triggered by an access point (AP). Switching to communicating on the 60 GHz channel may also be triggered by a subscriber station (STA).

The method may include switching back to the base channel if the 60 GHz channel fails. The method may also include switching back to the base channel based on physical layer (PHY) metrics of the 60 GHz channel. The method may further include switching back to the base channel if a successful frame exchange has not occurred on the 60 GHz channel within a predefined window. Data may be sent to the wireless device on the 60 GHz channel. The base channel may be an 802.11 WLAN operating at 2.4 GHz. Alternatively, the base channel may be an 802.11 WLAN operating at 5 GHz.

The channel switch request may include a tunneled direct link setup (TDLS) channel switch response. The channel switch request may also include a very high throughput (VHT) channel switch request. Data may be received from the wireless device on the 60 GHz channel. The method may also include waiting at least a switch time before communicating with a subscriber station on the 60 GHz channel, wherein the switch time is a predefined time period for switching to occur. The method may further include waiting at least a switch time before sending a hello frame to the subscriber station on the 60 GHz channel, wherein the switch time is a predefined time period for switching to occur.

The method may also include switching back to communicating with the wireless device on the base channel if a continuation frame is received from the wireless device on the base channel. A physical layer (PHY) signal may be sent when a bad connection is detected with the wireless device.

An apparatus configured to switch between channels on different bands in a wireless communications system is described. The apparatus may include a processor. The apparatus may also include circuitry coupled to the processor. The circuitry may be configured to communicate with a wireless device on a base channel. The circuitry may also be configured to send a channel switch request to the wireless device. The circuitry may further be configured to receive an acknowledgment from the wireless device. The circuitry may also be configured to switch to a 60 GHz channel for communicating with the wireless device. The wireless device may be an access point (AP). Alternatively, the wireless device may be a subscriber station (STA). The apparatus may be an access point (AP). Alternatively, the apparatus may be a subscriber station (STA).

An apparatus configured to switch between channels on different bands in a wireless communications system is described. The apparatus may include a processor. The apparatus may also include circuitry coupled to the processor. The circuitry may be configured to communicate with a wireless device on a base channel. The circuitry may also be configured to receive a channel switch request from the wireless device. The circuitry may further be configured to send an acknowledgment to the wireless device. The circuitry may also be configured to switch to a 60 GHz channel for communicating with the wireless device. The wireless device may be an access point (AP). Alternatively, the wireless device may be a subscriber station (STA). The apparatus may be an access point (AP). Alternatively, the apparatus may be a subscriber station (STA).

An apparatus configured to switch between channels on different bands in a wireless communications system is also described. The apparatus may include means for communicating with a wireless device on a base channel. The apparatus may also include means for sending a channel switch request to the wireless device. The apparatus may further include means for receiving an acknowledgment from the wireless device. The apparatus may also include means for switching to a 60 GHz channel for communicating with the wireless device.

An apparatus configured to switch between channels on different bands in a wireless communications system is also described. The apparatus may include means for communicating with a wireless device on a base channel. The apparatus may also include means for receiving a channel switch request from the wireless device. The apparatus may further include means for sending an acknowledgment to the wireless device. The apparatus may also include means for switching to a 60 GHz channel for communicating with the wireless device.

A computer-program product for switching between channels on different bands in a wireless communications system is described. The computer-program product may include a computer-readable medium having instructions thereon. The instructions may include code for communicating with a wireless device on a base channel. The instructions may also include code for sending a channel switch request to the wireless device. The instructions may further include code for receiving an acknowledgment from the wireless device. The instructions may also include code for switching to a 60 GHz channel for communicating with the wireless device.

A computer-program product for switching between channels on different bands in a wireless communications system is described. The computer-program product may include a computer-readable medium having instructions thereon. The instructions may include code for communicating with a wireless device on a base channel. The instructions may also include code for receiving a channel switch request from the wireless device. The instructions may further include code for sending an acknowledgment to the wireless device. The instructions may also include code for switching to a 60 GHz channel for communicating with the wireless device.

A method for testing a 60 GHz band is also described. The method may include communicating with a wireless device on a base channel. A signal indicating a power save mode may be sent. The method may include switching to a 60 GHz channel. A test signal may be sent to the wireless device. The wireless device may be an access point (AP). The test signal may use a robust physical layer (PHY) mode.

A method for switching between channels on different bands is described. The method includes communicating with a wireless device on a 60 GHz channel. The method also includes switching to a base channel. A continuation frame is sent to the wireless device.

The switching may be based on performance metrics of the 60 GHz channel. The switching may occur when the communication on the 60 GHz channel is lost. The communication may be continued on the base channel. The communication may take place over a direct link.

A method for switching between channels on different bands is described. The method includes communicating with a wireless device on a 60 GHz channel. A channel switch request is sent to the wireless device. An acknowledgment is received from the wireless device. The method also includes switching to a base channel.

The switching may be based on physical layer (PHY) metrics of the 60 GHz channel. The switching may also be based on performance metrics of the 60 GHz channel. The channel switch request frame may be transmitted using a robust PHY mode.

The Institute of Electronic and Electrical Engineers (IEEE) 802.11 Working Group aims to prepare formal standards for wireless local area network (WLAN) computer communication in the 2.4 GHz, 5 GHz, and 60 GHz public spectrum bands.

The IEEE 802.11 group is currently looking into standardizing a new and faster version of 802.11, under the name VHT (Very High Throughput). Technologies are being considered in this group that allow for multiple transmissions to occur in parallel without causing a collision, like SDMA and OFDMA. The IEEE 802.11 group is considering defining IEEE 802.11 operation in the 60 GHz band, next to the existing 2.4 GHz and 5 GHz bands.

An IEEE 802.11 system has typically operated in the 2.4 GHz and 5 GHz channels. With the release of the 60 GHz channel for 802.11, wireless devices can communicate on both the 60 GHz channel and the 2.4/5 GHz base channels. Communication on the 60 GHz channel may create the potential for gigabit-per-second (Gbps) throughput. However, a 60 GHz physical layer may have on/off behavior such that a link on the 60 GHz channel may break unexpectedly.

FIG. 1 illustrates a system 100 including an access point (AP) 102 in wireless electronic communication with multiple subscriber stations (STA) 104, 106 on either a base channel or a 60 GHz channel. The access point 102 may be a base station. The subscriber stations 104, 106 may be a mobile station such as mobile phones and wireless networking cards. The subscriber stations 104, 106 may also be in electronic communication with each other on either the base channel or a 60 GHz channel. The base channel may be a 2.4 GHz or a 5 GHz channel.

An AP 102 may operate on both the base channel and the 60 GHz channel concurrently using a dual MAC. An STA may only be required to operate on one band at a time.

Figure 2:
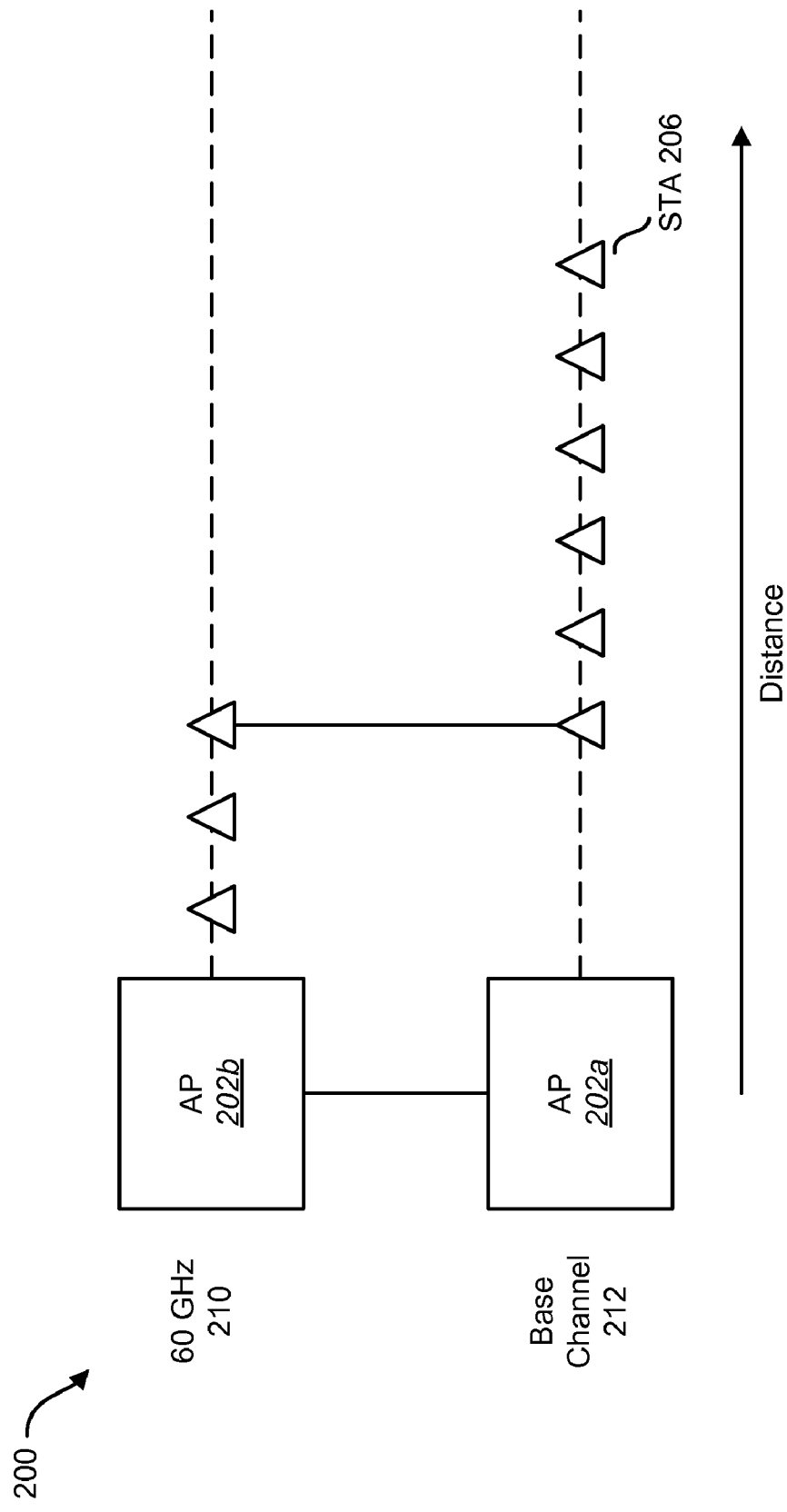
FIG. 2 illustrates a system that includes an AP and an STA in wireless electronic communication.

FIG. 2 illustrates a system 200 that includes an AP 202 and an STA 206 in wireless electronic communication. The AP 202 may operate on both the base channel 212 and the 60 GHz channel 210 at the same time. The STA 206 may only operate on one channel at a time, and is thus either operating on the base channel 212 or operating on the 60 GHz channel 210. It is assumed that the 60 GHz channel 210 does not interfere with an 802.11 base channel 212 in 2.4/5 GHz.

The 60 GHz channel 210 only works well when the distance between the two devices communicating on the 60 GHz channel 210 is small enough. If the devices are far enough apart, communication may occur on the base channel 212. Thus, in FIG. 2, the STA 206 communicates with the AP 202 on the base channel 212 when the STA 206 is a larger distance away from the AP 202. Likewise, the STA 206 may communicate with the AP 202 on the 60 GHz channel 210 when the STA 206 is a smaller distance away from the AP 202. Although the figure uses distance, the communication channel may also depend on other characteristics on the base channel including the signal to noise ratio (SNR), the signal strength, and the packet error rate (PER). Communication on the 60 GHz channel 210 may use different channel configurations than the communication on the base channel 212. For example, communication on the 60 GHz channel 210 may use different channel width and a different channel modulation such as a 60 GHz modulation and coding scheme (MCS). Beacons and traffic indication map (TIM) frames may be present on the 60 GHz channel 210. It may be possible to associate on the 60 GHz channel 210. A beacon may include an information element that indicates the power at which the beacon was transmitted. This information element may be augmented with the antenna gain or channel characteristics.

The STA 206 may send a test frame on the 60 GHz channel 210 to determine the 60 GHz channel 210 characteristics prior to switching the communication with the AP 202 to the 60 GHz channel 210. It may be necessary for such a channel switch to have a low complexity and to cause only a brief interruption. The STA 206 may also use passive scanning to determine the 60 GHz channel 210 characteristics by waiting for a broadcast frame on the 60 GHz channel 210.

The STA 206 may also use a data frame to determine the channel characteristics of the 60 GHz channel 210. If the STA 206 does not receive a response to the data frame, the STA 206 may infer a bad link on the 60 GHz channel 210. The STA 206 may also use passive scanning to determine the channel characteristics of the 60 GHz channel 210. Alternatively, the STA 206 may test the 60 GHz channel 210 as part of a regular channel scan performed by the STA 206 as part of the normal roaming algorithm.

The STA 206 may also test the 60 GHz channel 210 after informing the AP 202 that the STA 206 will be absent for a while (such as going into power save). The STA 206 may then transfer to the 60 GHz channel 210 to send a test frame. The test frame may use a special robust PHY mode and the AP 202 may respond using a similar robust PHY mode.

If the wireless devices are communicating on the 60 GHz channel 210 and the 60 GHz channel 210 fails, each of the wireless devices may switch back to communicating with each other on the base channel 212. Furthermore, if a successful frame exchange has not occurred on the 60 GHz channel 210 within a predefined window, the wireless devices may switch back to communicating with each other on the base channel 212. Either wireless device may switch back to the base channel 212 if the physical layer (PHY) metrics of the 60 GHz channel 210 indicates so. For example, the PHY metrics of the 60 GHz channel 210 may indicate that successful communication on the 60 GHz channel 210 is unlikely. If either wireless device detects low capabilities of the 60 GHz channel 210, the wireless device may switch back to communicating on the base channel 212. A wireless device may also send a PHY signal to another wireless device that indicates a bad connection on the 60 GHz channel 210. For example, the AP 202 may send a PHY signal to the STA 206 that indicates that the 60 GHz channel 210 connection is having problems or is otherwise bad.

If the STA 206 needs to switch back to the base channel 212, the STA 206 may send a continuation frame on the base channel 212 to the AP 202 to indicate that the STA 206 has switched to the base channel 212. Upon receiving a continuation frame on the base channel, the AP 202 may switch to communicating with the STA 206 on the base channel 212.

If the connection on the 60 GHz channel 210 fails, the AP 202 may also repeatedly transmit a PHY signal that is similar to a panic signal on the 60 GHz channel 210 until the AP 202 receives a similar robust PHY signal from the STA 206 on the 60 GHz channel 210 or until the AP 202 receives a continuation frame from the STA 206 on the base channel 212. Alternatively, the AP 202 and the STA 206 may automatically switch back to the base channel 212 from the 60 GHz channel 210 if a successful frame exchange has not occurred during a predefined keepalive window. The keepalive window may be relatively short, because a high throughput connection is not likely to experience long gaps. Thus, if a successful frame exchange does not occur for a specified amount of time, the AP 202 and the STA 206 may automatically switch back to communicating on the base channel 212.

Multiple contenders may communicate with a single AP 202 on the 60 GHz channel 210. The same rules used in carrier sense multiple access/collision avoidance (CSMA/CA) that apply to the base channel 212 may also apply to the 60 GHz channel 210. However, the 60 GHz MAC may include additional enhancements or simplifications. One advantage of the 60 GHz band is that no radar detection may be required.

A channel switch to 60 GHz may introduce additional complexity to the AP 202. The AP 202 may have to re-queue MPDUs at the other MAC when a switch occurs. The AP 202 may have ample time to do so but the implementation may be such that the switch is as smooth as possible. Because the STA 206 is never active on multiple channels, no re-queuing of MPDUs is necessary. However, the STA 206 may have to review the scheduled aggregate MPDUs (A-MPDUs) and transmission opportunities (TXOPs) because the PHY rate and/or the maximum TXOP duration may change dramatically when transferring to a different channel.

The 60 GHz channel 210 may use the same basic service set identifier (BSSID) as the base channel 212. The same BSSID is easier to implement because the counter mode (CTR) with cipher-block chaining message authentication code (CBC-MAC) or CCMP security key depends on the BSSID through the additional authentication data (AAD). If legacy devices are present when the same BSSID is used, the legacy devices may see the same AP 202 on different channels. This may confuse the legacy devices. This does not apply to the 60 GHz channel 210 because the stations that are capable of communicating on the 60 GHz channel 210 will know in advance that the BSSID in the 60 GHz band will be the same as in the base channel 210. Alternatively, the 60 GHz channel 210 may use a different BSSID. The other BSSID would be known in advance so that the key can be pre-computed and pre-loaded.

One advantage of the 60 GHz channel 210 is that the MAC protocol may differ from the MAC protocol of the base channel 212. This may allow higher efficiency when taking into account the shorter range of the 60 GHz channel 210.

Figure 3:
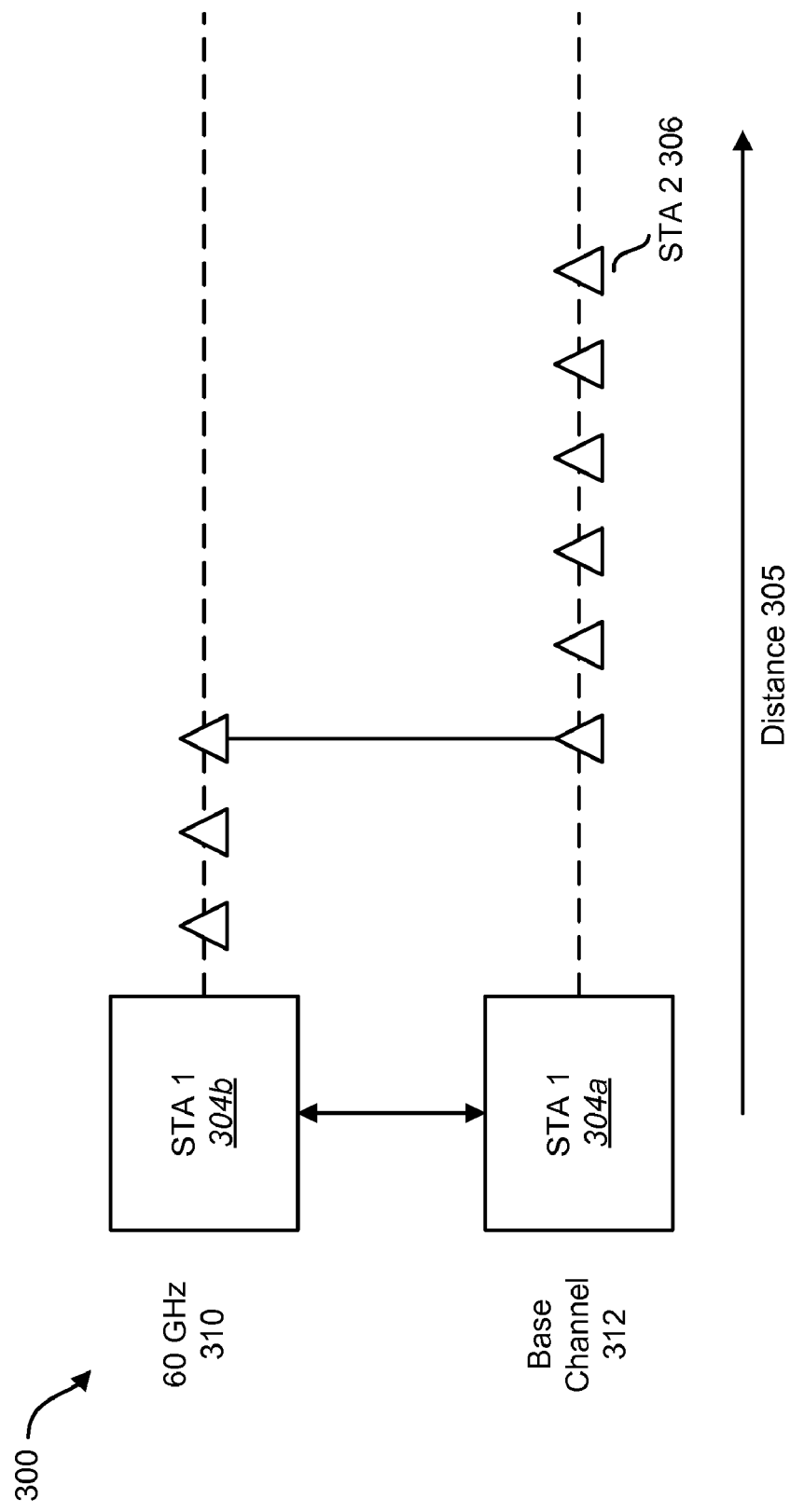
FIG. 3 illustrates a system that includes two STAs in wireless electronic communication with each other.

FIG. 3 illustrates a system 300 that includes two STAs 304, 306 in wireless electronic communication with each other. As discussed above, an STA 304, 306 only operates on one communication channel at a time. Thus, as the distance 305 between STA 1 304 and STA 2 306 becomes larger, both STA 1 304 and STA 2 306 communicate with each other on the base channel 312. When conditions on the base channel 312 warrant (SNR, distance, signal strength, PER, etc.), STA 1 304 and STA 2 306 may switch to communicating with each other on the 60 GHz channel 310. STA 1 304 is shown communicating on both the base channel 312 and the 60 GHz channel 310, but it may only communicate on one of these channels at a time.

STA 1 304 and STA 2 306 may determine the 60 GHz channel 310 characteristics by temporarily switching to the 60 GHz channel 310 for a fixed amount of time to allow at least one of the subscriber stations 304, 306 to count down a backoff and transmit a test frame. The test frame may be responded to by another test frame. There may need to be a link test exchange, which is similar to a channel switch frame but with a fixed stay on the 60 GHz channel 310. A less accurate estimate of the 60 GHz channel 310 characteristics may be obtained from extrapolating measurements on the base channel 312. For example, either STA 1 304 or STA 2

306 may estimate the signal-loss in the base channel 312 between the two devices. This may be done by measuring the received signal strength and using knowledge of the transmitted signal power and expected antenna gains. Transmitted signal power and antenna gain may be communicated by each station in separate management frames. The link quality in 60 GHz may then be estimated by computing the expected signal-loss in 60 GHz. One method for estimating the signal-loss in 60 GHz is by adding the base channel path-loss (in dB) to a factor 20*log 10(60e9/base channel frequency) and making adjustments for difference in antenna gains between the base channel and the 60 GHz band. Using this method, the estimated signal-loss in 60 GHz will be approximately 28 dB greater than the signal-loss in the 2.4 GHz industrial, scientific and medical (ISM) band when antenna gains are equal between the two bands.

Figure 4:
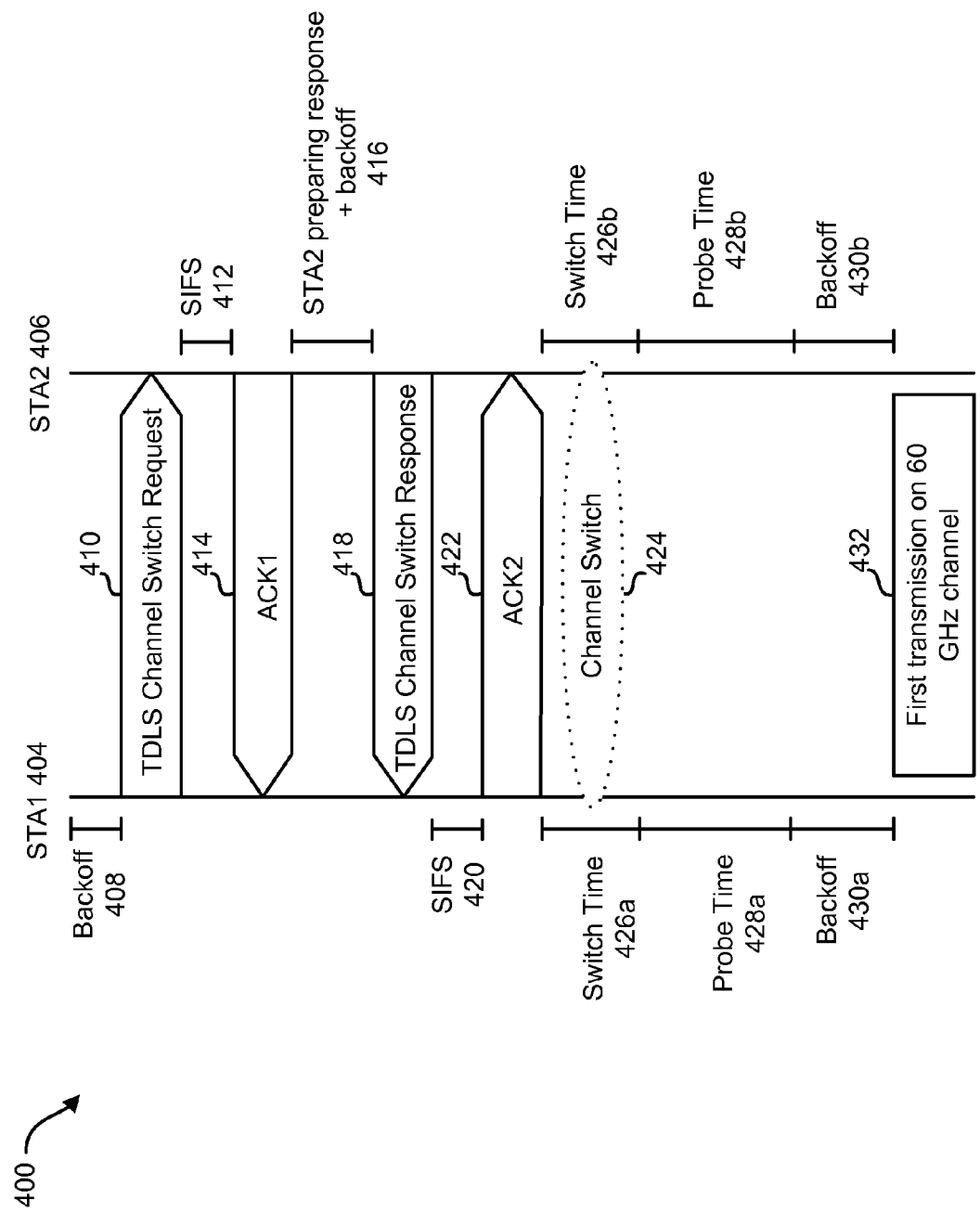
FIG. 4 illustrates a system for transmission schemes between subscriber station STA 1 and subscriber station STA 2 during a tunneled direct link setup (TDLS) channel switch from the base channel to the 60 GHz channel.

FIG. 4 illustrates a system 400 for transmission schemes between subscriber station STA 1 404 and subscriber station STA 2 406 during a tunneled direct link setup (TDLS) channel switch from the base channel 212 to the 60 GHz channel 210. STA 1 404 may first wait a requisite backoff 408. STA 1 404 may then send a TDLS channel switch request 410 to STA 2 406. Upon receiving the TDLS channel switch request 410, STA 2 406 may wait a short inter-frame space (SIFS) 412 before acknowledging the TDLS channel switch request 410 by sending an acknowledgment (ACK) 414 to STA 1 404. STA 2 406 may then prepare a response to the TDLS channel switch request 410. For example, STA 2 406 may prepare a response denying or accepting the TDLS channel switch request 410. After STA 2 406 has prepared a response and waited for a sufficient backoff time 416, STA 2 406 may send the TDLS channel switch response 418 to STA 1 404. STA 1 404 may receive the TDLS channel switch response 418 and send an ACK 422 after a SIFS 420.

Assuming that STA 2 406 has accepted the TDLS channel switch request 410, STA 1 404 and STA 2 406 may then switch 424 from the base channel 212 to the 60 GHz channel 210. Both STA 1 404 and STA 2 406 may require a switch time 426 to switch to the 60 GHz channel 210. A switch time 426 may be a predefined time period during which switching may occur. Both STA 1 404 and STA 2 406 may then wait for a probe time 428 and a backoff time 430 before sending/receiving a first transmission 432 on the 60 GHz channel 210. Either STA 1 404 or STA 2 406 may send the first transmission 432 on the 60 GHz channel 210. Alternatively, STA 1 404 may send a first signal indicating to STA 2 406 that STA 1 404 has successfully switched to the 60 GHz channel 210.

Figure 5:
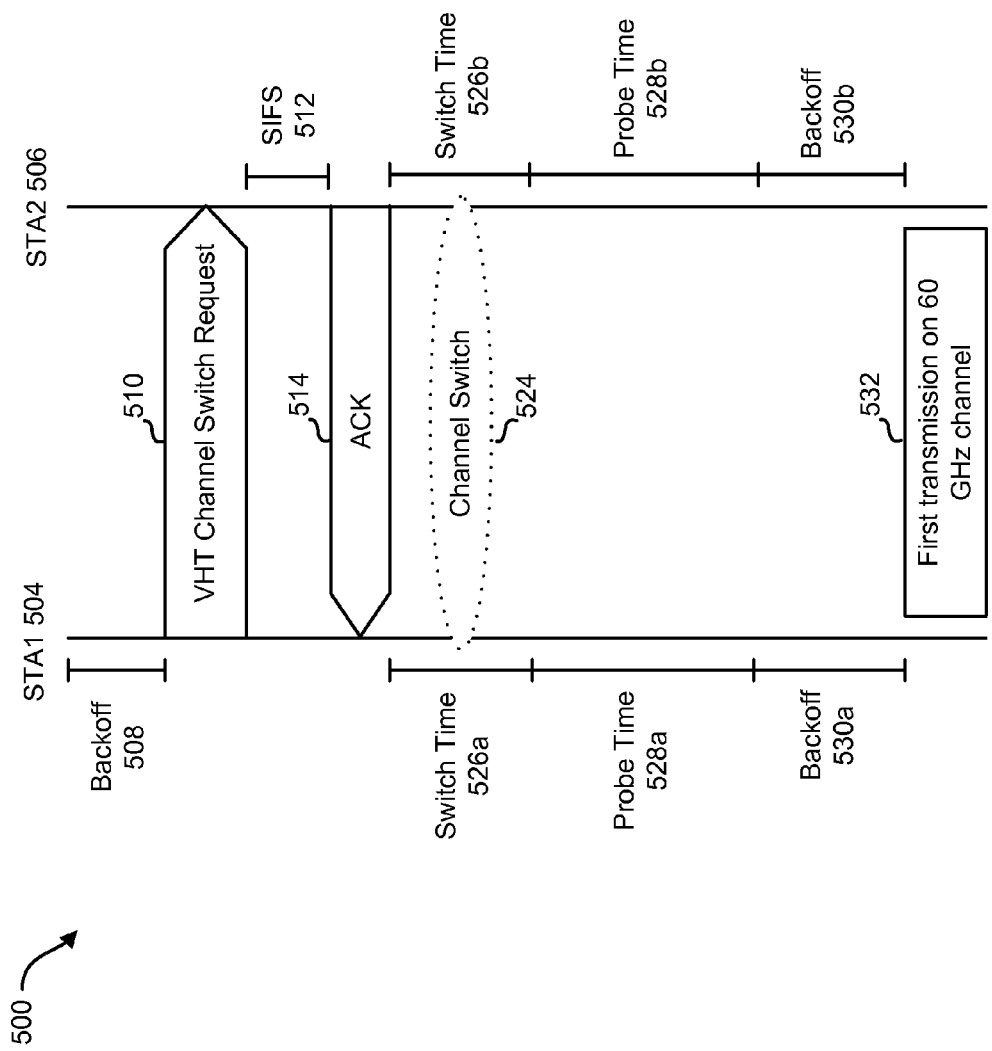
FIG. 5 illustrates a system for transmission schemes between subscriber station STA 1 and subscriber station STA 2 during a very high throughput (VHT) channel switch from the base channel to the 60 GHz channel.

FIG. 5 illustrates a system 500 for transmission schemes between subscriber station STA 1 504 and subscriber station STA 2 506 during a very high throughput (VHT) channel switch from the base channel 212 to the 60 GHz channel 210. FIG. 5 is a simplified single request/single response exchange that may speed up the switching to the 60 GHz channel 210 when compared with FIG. 4. STA 1 504 may first wait a requisite backoff 508. STA 1 504 may then send a VHT channel switch request 510 to STA 2 506. Upon receiving the VHT channel switch request 510, STA 2 506 may wait a SIFS 512 before sending an ACK 514 to STA 1 504. Both STA 1 504 and STA 2 506 may then switch 524 from the base channel 212 to the 60 GHz channel 210 during a switch time 526. The switch time 526 may be followed by a probe time 528 and a backoff 530. Either STA 1 504 or STA 2 506 may then send the first transmission 532 on the 60 GHz channel 210.

Figure 6:
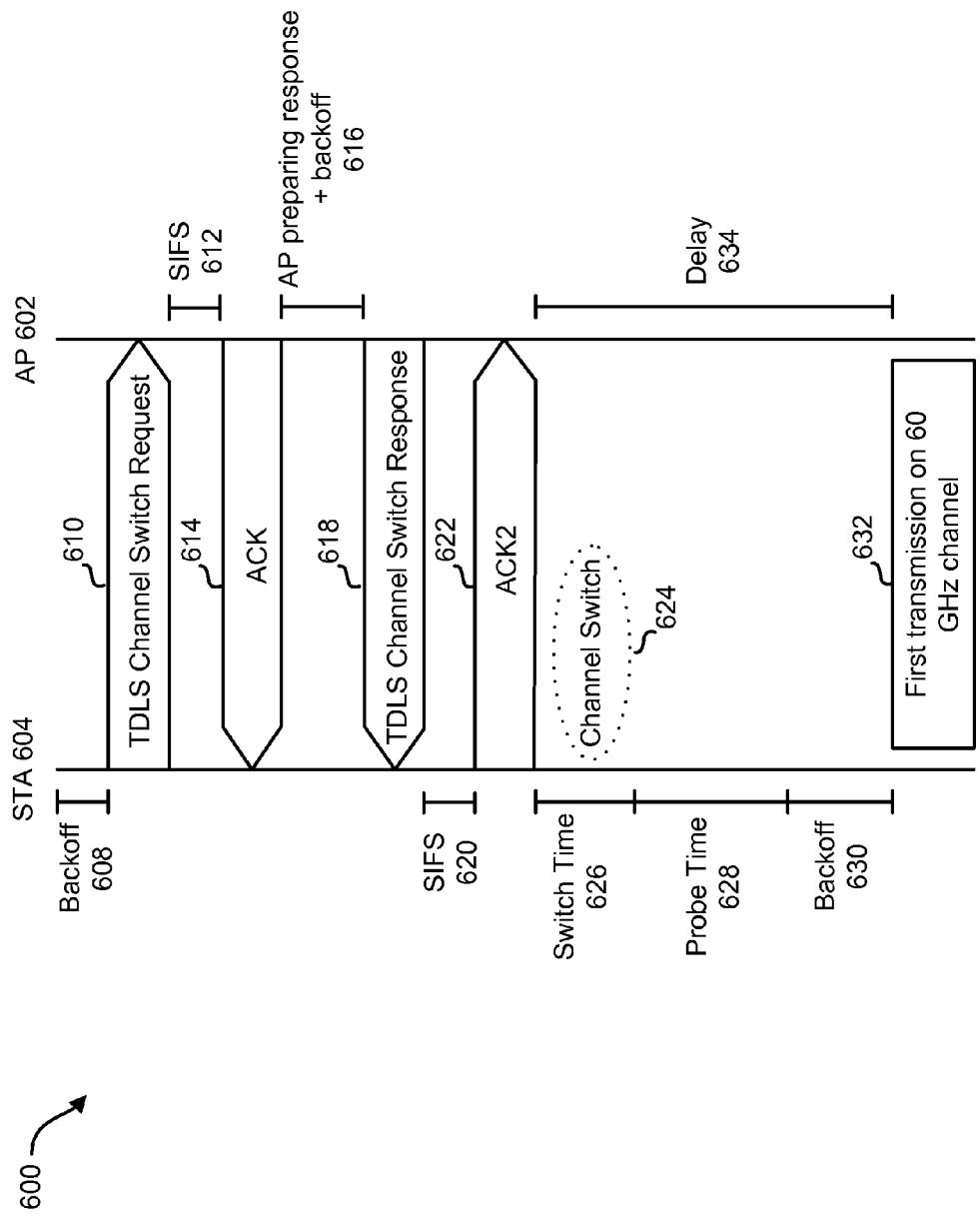
FIG. 6 illustrates a system for transmission schemes between a subscriber station (STA) and an access point (AP), wherein the STA signals a channel switch from the base channel to the 60 GHz channel using a TDLS channel switch request.

FIG. 6 illustrates a system 600 for transmission schemes between a subscriber station (STA) 604 and an access point (AP) 602, wherein the STA 604 signals a channel switch from the base channel 212 to the 60 GHz channel 210 using a TDLS channel switch request 610. The STA 604 may first wait a requisite backoff time 608. The STA 604 may then send a TDLS channel switch request 610 to the AP 602 and the AP 602 may respond with an ACK 614 after a SIFS 612. The AP 602 may then prepare a response to the received TDLS channel switch request 610 along with waiting a requisite backoff 616. The AP 602 may then send a TDLS channel switch response 618 to the STA 604. The STA 604 may wait a SIFS 620 before sending an ACK 622 back to the AP 602. After receiving the ACK 622, the AP 602 may transfer any pending frames for the STA 604 to the 60 GHz MAC. The 60 GHz MAC may use different channel access rules than the base channel MAC.

Assuming that the AP 602 has accepted the STA 604 request for a channel switch 624, the STA 604 may then switch 624 to operating on the 60 GHz channel 210 during a switch time 626. The AP 602 may operate on both the base channel 212 and the 60 GHz channel 210 and thus, the AP 602 does not need to switch channels. Instead, the AP 602 waits a delay 634 while the STA 604 switches channels 624, waits a probe time 628, and waits a backoff 630. The delay 634 may be as short as the switch time 626 if the AP 602 wishes to transmit to the STA 604. Then, the first transmission 632 on the 60 GHz channel 210 may occur. Either the AP 602 or the STA 604 may send the first transmission 632 on the 60 GHz channel 210. Alternatively, the STA 604 may send a first transmission 632 or hello signal on the 60 GHz channel 210 to indicate that the STA 604 has successfully transferred to the 60 GHz channel 210.

Figure 7:
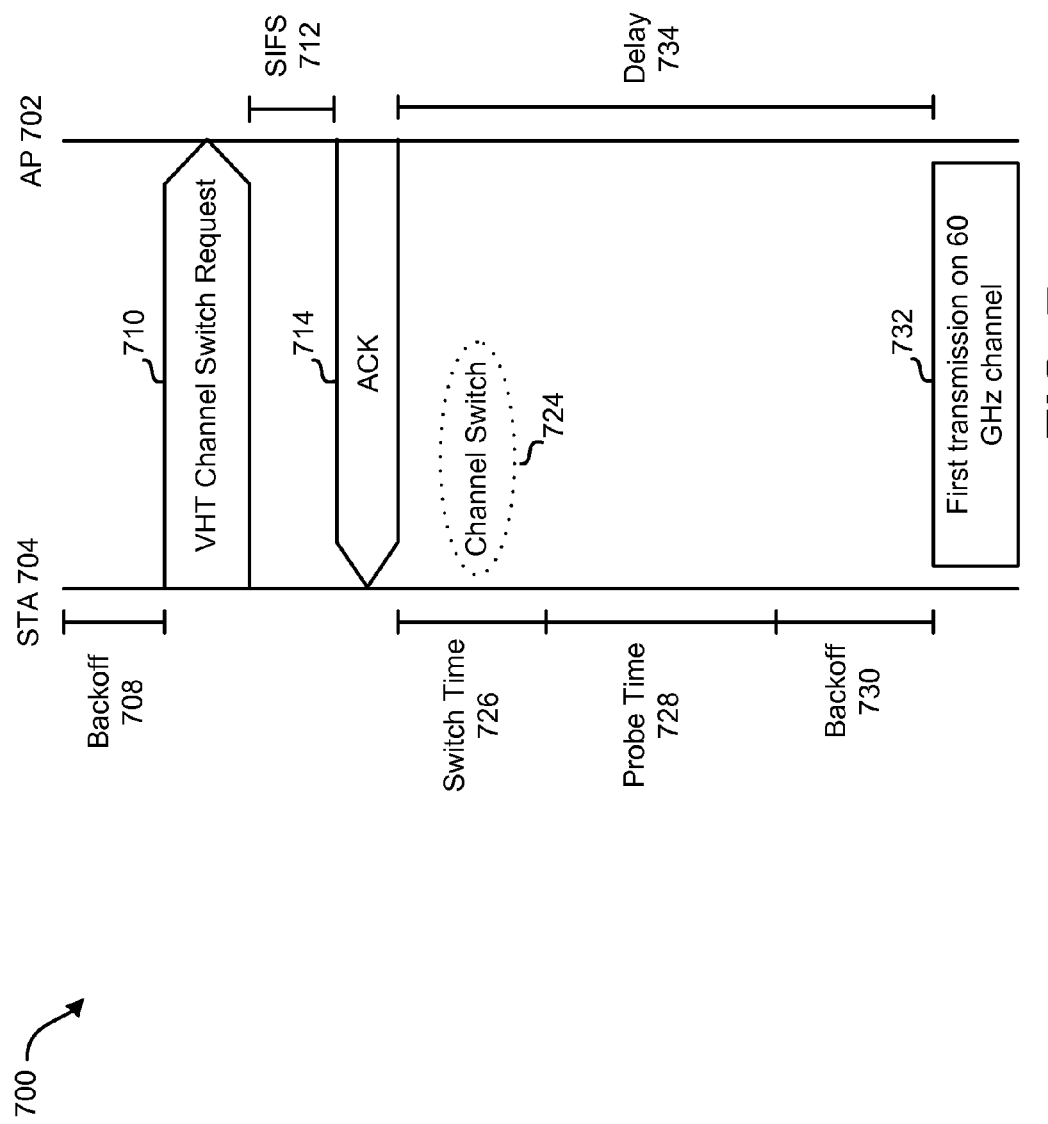
FIG. 7 illustrates a system for transmission schemes between a subscriber station (STA) and an access point (AP), where the STA signals a channel switch from the base channel to the 60 GHz channel using a VHT channel switch request.

FIG. 7 illustrates a system 700 for transmission schemes between a subscriber station (STA) 704 and an access point (AP) 702, where the STA 704 signals a channel switch 724 from the base channel 212 to the 60 GHz channel 210 using a VHT channel switch request 710. The STA 704 may first wait a requisite backoff 708. The STA 704 may then send a VHT channel switch request 710 to the AP 702. Upon receiving the VHT channel switch request 710, the AP 702 may wait a SIFS 712 before sending an ACK 714 to the STA 704. The STA 704 may then switch 724 from the base channel 212 to the 60 GHz channel 210 during a switch time 726. The switch time 726 may be followed by a probe time 728 and a backoff 730. The AP 702 may delay 734 until the STA 704 has finished the switch time 726, probe time 728, and backoff 730, after which the STA 704 may then send the first transmission 732 on the 60 GHz channel 210. The AP 702 may send the first transmission 732 to the STA 704 after the switch time 726 has expired. The AP 702 may be required to wait an additional backoff 730 after the switch time 726 has expired before sending the first transmission 732.

Figure 8:
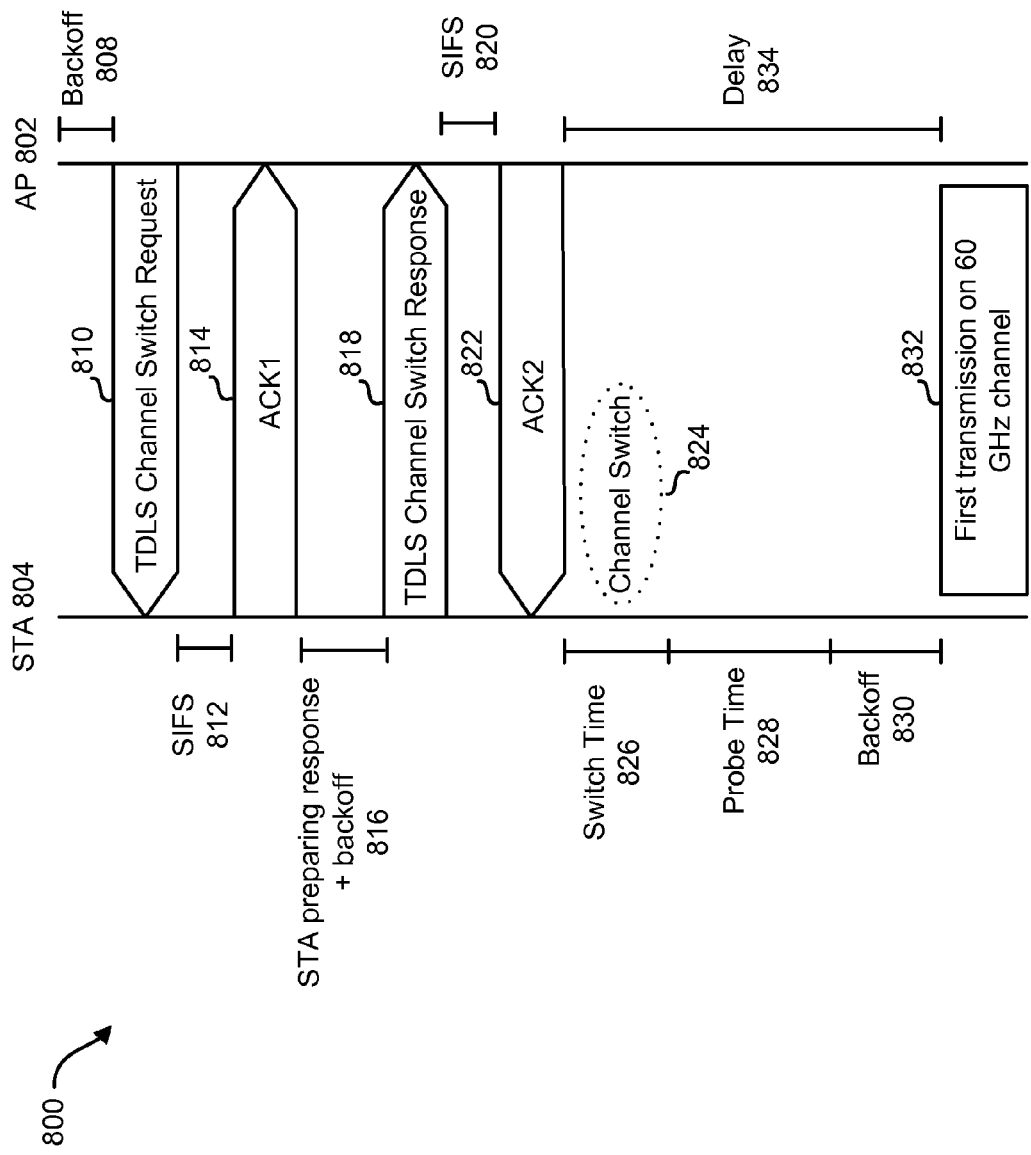
FIG. 8 illustrates a system for transmission schemes between a subscriber station (STA) and an access point (AP), where the AP signals a channel switch from the base channel to the 60 GHz channel using a TDLS channel switch request.

FIG. 8 illustrates a system 800 for transmission schemes between a subscriber station (STA) 804 and an access point (AP) 802, where the AP 802 signals a channel switch 824 from the base channel 212 to the 60 GHz channel 210 using a TDLS channel switch request 810. The AP 802 may first wait a requisite backoff time 808. The AP 802 may then send a TDLS channel switch request 810 to the STA 804 and the STA 804 may respond with an ACK 814 after a SIFS 812. The STA 804 may then prepare a response to the received TDLS channel switch request 810 along with waiting a requisite backoff 816. The STA 804 may then send a TDLS channel switch response 818 to the AP 802. The AP 802 may wait a SIFS 820 before sending an ACK 822 back to the STA 804. After sending the ACK 822, the AP 802 may transfer any pending frames for the STA 804 to the 60 GHz MAC. As discussed above in relation to FIG. 6, the 60 GHz MAC may use different channel access rules than the base channel MAC.

Assuming that the STA 804 has accepted the AP 802 request for a channel switch, the STA 804 may then switch 824 to operating on the 60 GHz channel 210 during a switch time 826. The AP 802 may operate on both the base channel 212 and the 60 GHz channel 210 simultaneously and thus, no channel switch is required for the AP 802. Instead, the AP 802 may wait a delay 834 while the STA 804 switches channels 824, after which the first transmission 832 from the AP 802 to the STA 804 may occur. If the AP 802 does not send the first transmission 832 after the switch time 826, the STA 804 may wait a probe time 828 and a backoff 830 before the STA 802 sends the first transmission 832 on the 60 GHz channel 210. Either the AP 802 or the STA 804 may send the first transmission 832 on the 60 GHz channel 210. Alternatively, the STA 804 may send a first transmission 832 or hello signal on the 60 GHz channel 210 to indicate that the STA 804 has successfully switched to the 60 GHz channel 210.

Figure 9:
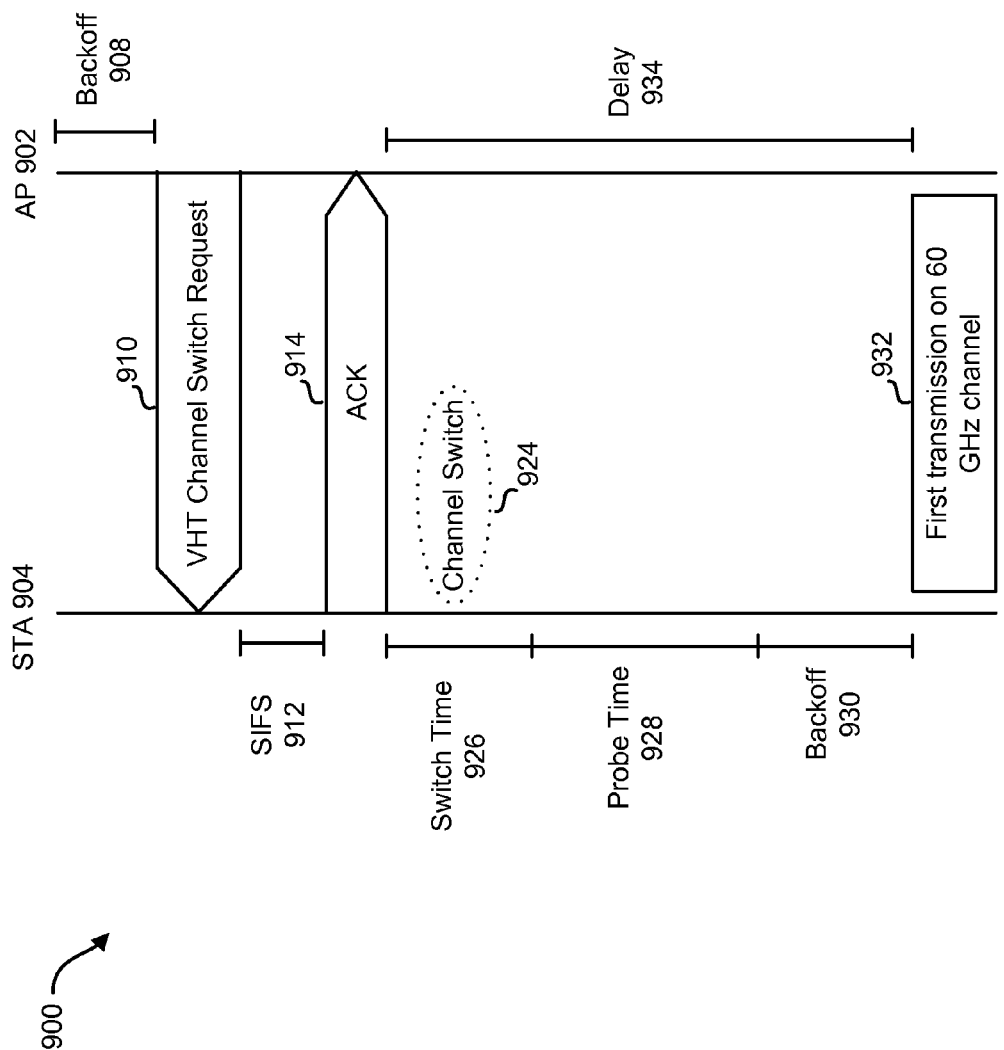
FIG. 9 illustrates a system for transmission schemes between a subscriber station (STA) and an access point (AP), where the AP signals a channel switch from the base channel to the 60 GHz channel using a VHT channel switch request.

FIG. 9 illustrates a system 900 for transmission schemes between a subscriber station (STA) 904 and an access point (AP) 902, where the AP 902 signals a channel switch 924 from the base channel 212 to the 60 GHz channel 210 using a VHT channel switch request 910. The AP 902 may first wait a requisite backoff 908. The AP 902 may then send a VHT channel switch request 910 to the STA 904. Upon receiving the VHT channel switch request 910, the STA 904 may wait a SIFS 912 before sending an ACK 914 to the AP 902. The STA 904 may then switch 924 from the base channel 212 to the 60 GHz channel 210 during a switch time 926. The switch time 926 may be followed by a probe time 928 and a backoff 930. The AP 902 may send the first transmission 932 to the STA 904 after a delay 934 that is at least the length of the switch time 926. The STA 904 may send the first transmission 932 only after the STA 904 has finished the channel switch 924 and then waited a probe time 928 and a backoff 930.

FIG. 10 is a flow diagram illustrating a method 1000 for a subscriber station STA 1 404 to trigger a switch from communicating with a subscriber station STA 2 406 on the base channel 212 to communicating with STA 2 406 on the 60 GHz channel 210 using a TLDS channel switch request 410. STA 1 404 may first send 1002 a TDLS channel switch request 410 to STA 2 406. STA 1 404 may then receive 1004 an ACK 414 and then receive 1006 a TDLS channel switch response 418 from STA 2 406. STA 1 404 may then send 1008 an ACK 422 to STA 2 406. STA 1 404 may then switch 1010 to operating on the 60 GHz channel 210. STA 1 404 may then send or receive 1012 the first transmission 432 on the 60 GHz channel 210.

The method 1000 of FIG. 10 described above may be performed by various hardware and/or software component(s) and/or module(s) corresponding to the means-plus-function blocks 1100 illustrated in FIG. 11. In other words, blocks 1002 through 1012 illustrated in FIG. 10 correspond to means-plus-function blocks 1102 through 1112 illustrated in FIG. 11.

Figures 12, 13:
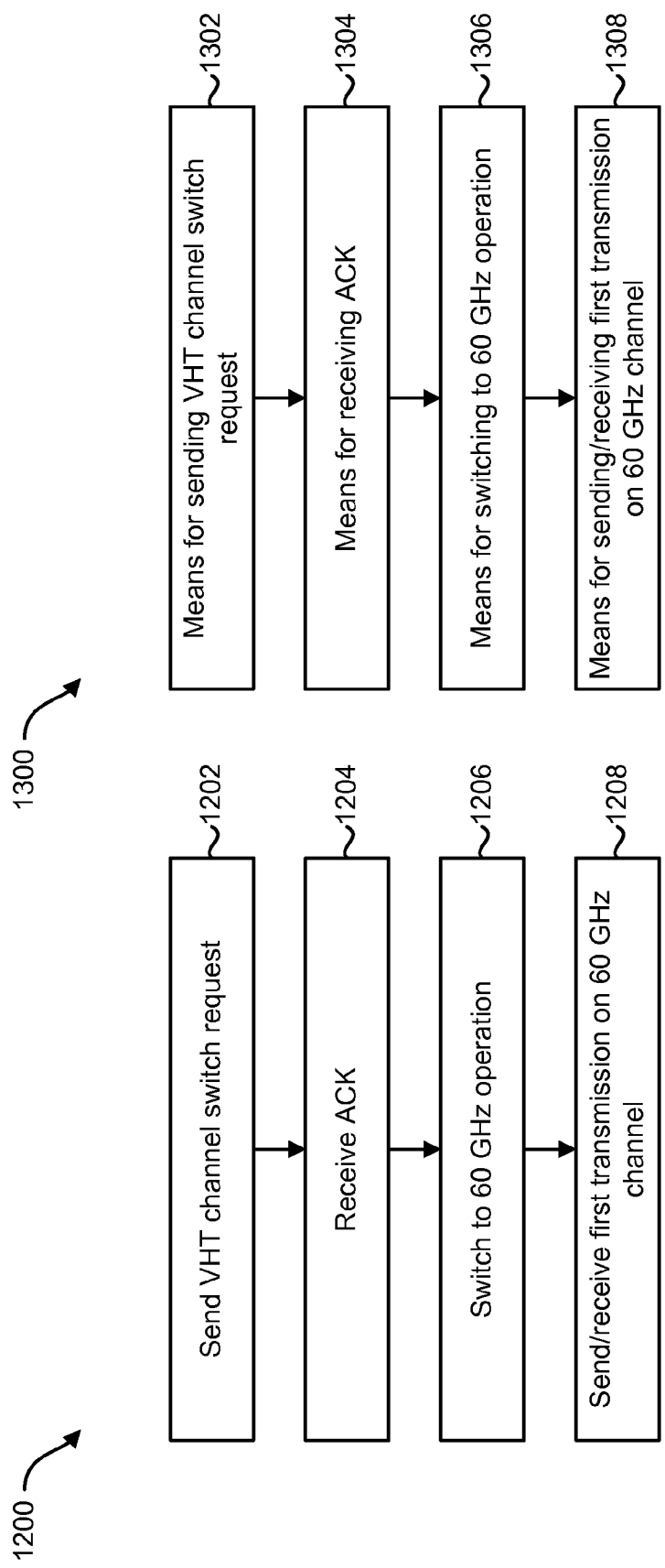
FIG. 12 is a flow diagram illustrating a method for a subscriber station STA 1 to trigger a switch from communicating with a subscriber station STA 2 on the base channel to communicating with STA 2 on the 60 GHz channel using a very high throughput (VHT) channel switch request.
FIG. 13 illustrates means-plus-function blocks corresponding to the method of FIG. 12.

FIG. 12 is a flow diagram illustrating a method 1200 for a subscriber station STA 1 504 to trigger a switch from communicating with a subscriber station STA 2 506 on the base channel 212 to communicating with STA 2 506 on the 60 GHz channel 210 using a very high throughput (VHT) channel switch request 510. STA 1 504 may first send 1202 a VHT channel switch request 510 to STA 2 506. STA 1 504 may then receive 1204 an ACK 514 from STA 2 506. STA 1 504 may switch 1206 to operating on the 60 GHz channel 210. STA 1 504 may then send or receive 1208 the first transmission 532 on the 60 GHz channel 210.

The method 1200 of FIG. 12 described above may be performed by various hardware and/or software component(s) and/or module(s) corresponding to the means-plus-function blocks 1300 illustrated in FIG. 13. In other words, blocks 1202 through 1208 illustrated in FIG. 12 correspond to means-plus-function blocks 1302 through 1308 illustrated in FIG. 13.

Figures 14, 15:
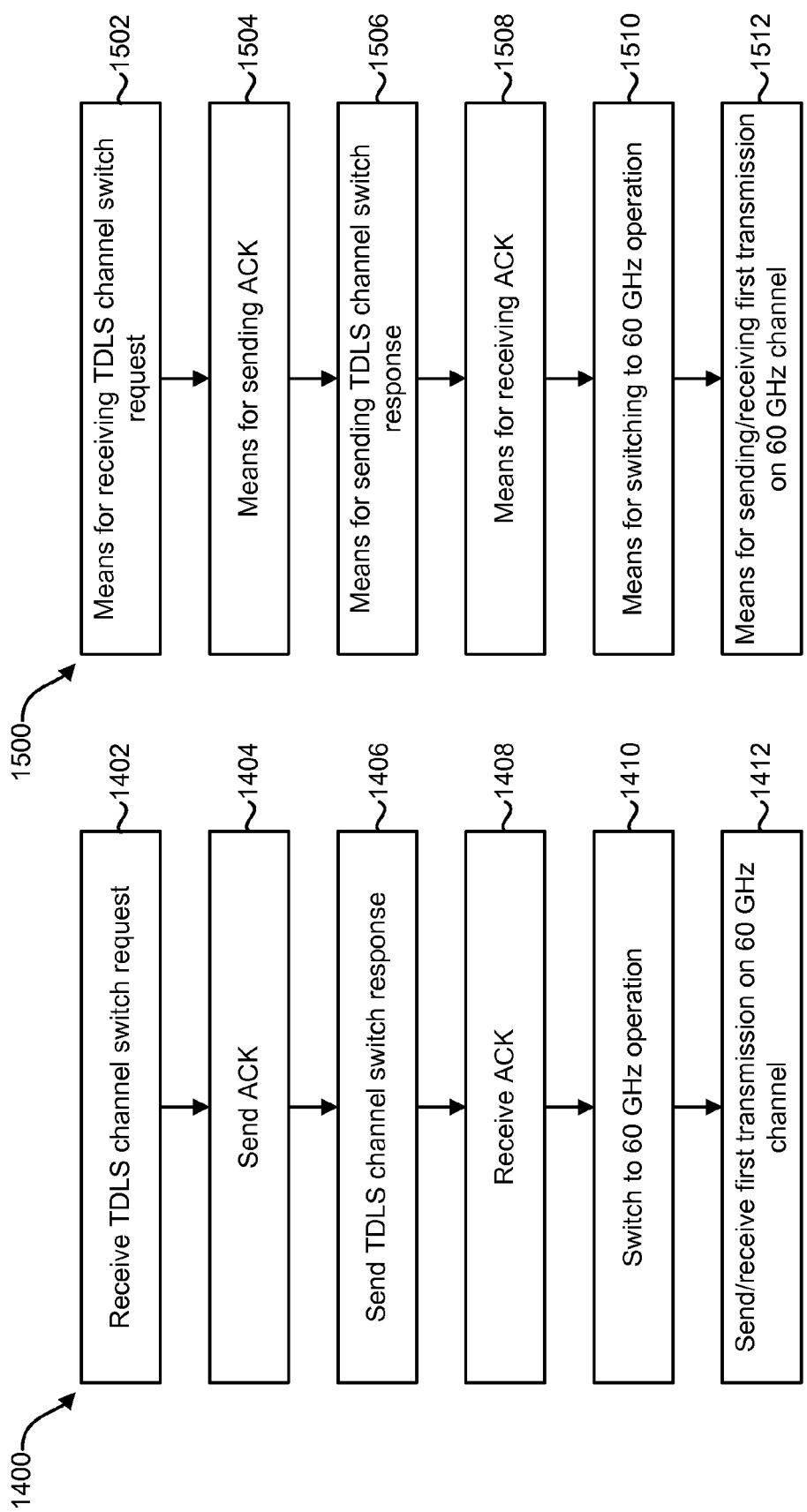
FIG. 14 is a flow diagram illustrating a method for a subscriber station STA to be triggered by an access point AP to switch from communicating with the AP on the base channel to communicating with the AP on the 60 GHz channel using a TDLS channel switch request.
FIG. 15 illustrates means-plus-function blocks corresponding to the method of FIG. 14.

FIG. 14 is a flow diagram illustrating a method 1400 for a subscriber station STA 604 to be triggered by an access point AP 602 to switch from communicating with the AP 602 on the base channel 212 to communicating with the AP 602 on the 60 GHz channel 210 using a TDLS channel switch request 610. The STA 604 may first receive 1402 a TDLS channel switch request 610 from the AP 602. The STA 604 may then send 1404 an ACK 614. The STA 604 may next send 1406 a TDLS channel switch response 618 to the AP 602. Upon receiving 1408 an ACK 622 from the AP 602, the STA 604 may switch 1410 to operating on the 60 GHz channel 210. The STA 604 may then send or receive 1412 the first transmission 632 on the 60 GHz channel 210.

The method 1400 of FIG. 14 described above may be performed by various hardware and/or software component(s) and/or module(s) corresponding to the means-plus-function blocks 1500 illustrated in FIG. 15. In other words, blocks 1402 through 1412 illustrated in FIG. 14 correspond to means-plus-function blocks 1502 through 1512 illustrated in FIG. 15.

Figures 16, 17:
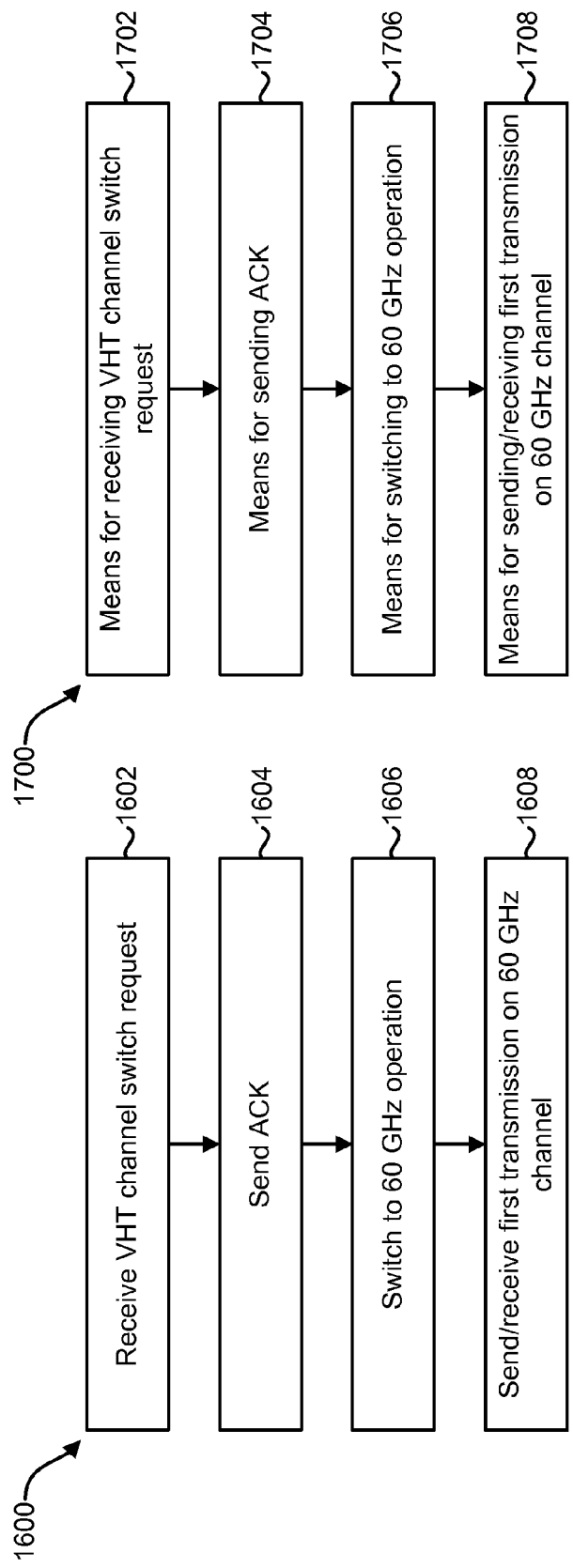
FIG. 16 is a flow diagram illustrating a method for a subscriber station STA to be triggered by an access point AP to switch from communicating with the AP on the base channel to communicating with the AP on the 60 GHz channel using a very high throughput (VHT) channel switch request.
FIG. 17 illustrates means-plus-function blocks corresponding to the method of FIG. 16.

FIG. 16 is a flow diagram illustrating a method 1600 for a subscriber station STA 704 to be triggered by an access point AP 702 to switch from communicating with the AP 702 on the base channel 212 to communicating with the AP 702 on the 60 GHz channel 210 using a very high throughput (VHT) channel switch request 710. The STA 704 may first receive 1602 a VHT channel switch request 710 from the AP 702. The STA 704 may then send 1604 an ACK 714 to the AP 702 and switch 1606 to operating on the 60 GHz channel 210. The STA 704 may then send or receive 1608 the first transmission 732 on the 60 GHz channel 210.

The method 1600 of FIG. 16 described above may be performed by various hardware and/or software component(s) and/or module(s) corresponding to the means-plus-function blocks 1700 illustrated in FIG. 17. In other words, blocks 1602 through 1608 illustrated in FIG. 16 correspond to means-plus-function blocks 1702 through 1708 illustrated in FIG. 17.

FIG. 18 is a flow diagram illustrating a method 1800 for an access point AP 802 to be triggered by a subscriber station STA 804 to switch from communicating with the STA 804 on the base channel 212 to communicating with the STA 804 on the 60 GHz channel 210 using a TDLS channel switch request 810. The AP 802 may first receive 1802 a TDLS channel switch request 810 from the STA 804. The AP 802 may then send 1804 an ACK 814. The AP 802 may next send 1806 a TDLS channel switch response 818 to the STA 804. The AP 802 may then receive 1808 an ACK 822 from the STA 804. The AP 102 may then send or receive 1810 the first transmission 832 on the 60 GHz channel 210.

The method 1800 of FIG. 18 described above may be performed by various hardware and/or software component(s) and/or module(s) corresponding to the means-plus-function blocks 1900 illustrated in FIG. 19. In other words, blocks 1802 through 1810 illustrated in FIG. 18 correspond to means-plus-function blocks 1902 through 1910 illustrated in FIG. 19.

FIG. 20 is a flow diagram illustrating a method 2000 for an access point AP 902 to be triggered by a subscriber station STA 904 to switch from communicating with the STA 904 on the base channel 212 to communicating with the STA 904 on the 60 GHz channel 210 using a VHT channel switch request 910. The AP 902 may first receive 2002 a VHT channel switch request 910 from the STA 904. The AP 902 may then send 2004 an ACK 914 to the STA 904. The AP 902 may then send or receive 2006 the first transmission 932 on the 60 GHz channel 210.

The method 2000 of FIG. 20 described above may be performed by various hardware and/or software component(s) and/or module(s) corresponding to the means-plus-function blocks 2100 illustrated in FIG. 21. In other words, blocks 2002 through 2006 illustrated in FIG. 20 correspond to means-plus-function blocks 2102 through 2106 illustrated in FIG. 21.

FIG. 22 illustrates certain components that may be included within a wireless device 2201. The wireless device 2201 may be a subscriber station or an access point.

The wireless device 2201 includes a processor 2203. The processor 2203 may be a general purpose single-or multi-chip microprocessor (e.g., an ARM), a special purpose microprocessor (e.g., a digital signal processor (DSP)), a microcontroller, a programmable gate array, etc. The processor 2203 may be referred to as a central processing unit (CPU). Although just a single processor 2203 is shown in the wireless device 2201 of FIG. 22, in an alternative configuration, a combination of processors (e.g., an ARM and DSP) could be used.

The wireless device 2201 also includes memory 2205. The memory 2205 may be any electronic component capable of storing electronic information. The memory 2205 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 2207 and instructions 2209 may be stored in the memory 2205. The instructions 2209 may be executable by the processor 2203 to implement the methods disclosed herein. Executing the instructions 2209 may involve the use of the data 2207 that is stored in the memory 2205.

The wireless device 2201 may also include a transmitter 2211 and a receiver 2213 to allow transmission and reception of signals between the wireless device 2201 and a remote location. The transmitter 2211 and receiver 2213 may be collectively referred to as a transceiver 2215. An antenna 2217 may be electrically coupled to the transceiver 2215. The wireless device 2201 may also include (not shown) multiple transmitters, multiple receivers, multiple transceivers and/or multiple antenna.

The various components of the wireless device 2201 may be coupled together by one or more buses, which may include a power bus, a control signal bus, a status signal bus, a data bus, etc. For the sake of clarity, the various buses are illustrated in FIG. 22 as a bus system 2219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on", unless expressly specified otherwise. In other words, the phrase "based on" describes both "based only on" and "based at least on".

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and BLU-RAY® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 10, 12, 14, 16, 18 and 20, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for switching between channels on different bands, the method comprising:
communicating, by a subscriber station (STA), with a wireless device on a base channel;
sending a channel switch request to the wireless device;
receiving an acknowledgment from the wireless device;
sending a test frame on a 60 GHz channel to determine channel characteristics of the 60 GHz channel before switching to the 60 GHz channel; and
switching to the 60 GHz channel for communicating with the wireless device.

2. The method of claim 1, wherein the wireless device is an access point (AP).

3. The method of claim 1, wherein the wireless device is a second subscriber station (STA).

4. The method of claim 1, wherein switching to communicating on the 60 GHz channel is triggered by an access point (AP).

5. The method of claim 1, wherein switching to communicating on the 60 GHz channel is triggered by the STA.

6. The method of claim 1, further comprising switching back to the base channel if the 60 GHz channel fails.

7. The method of claim 1, further comprising switching back to the base channel based on physical layer (PHY) metrics of the 60 GHz channel.

8. The method of claim 1, further comprising switching back to the base channel if a successful frame exchange has not occurred on the 60 GHz channel within a predefined window.

9. The method of claim 1, further comprising sending data to the wireless device on the 60 GHz channel.

10. The method of claim 1, wherein the base channel is an 802.11 WLAN operating at 2.4 GHz.

11. The method of claim 1, wherein the base channel is an 802.11 WLAN operating at 5 GHz.

12. The method of claim 1, wherein the channel switch request comprises a tunneled direct link setup (TDLS) channel switch response.

13. The method of claim 1, wherein the channel switch request comprises a very high throughput (VHT) channel switch request.

14. The method of claim 1, further comprising receiving data from the wireless device on the 60 GHz channel.

15. The method of claim 1, further comprising receiving a channel switch response from the wireless device.

16. The method of claim 15, further comprising sending an acknowledgment acknowledging receipt of the channel switch response to the wireless device.

17. The method of claim 1, further comprising waiting at least a switch time before communicating with a subscriber station on the 60 GHz channel, wherein the switch time is a time period for switching to occur.

18. The method of claim 17, further comprising switching back to the base channel when no communication starts on the 60 GHz channel within a second time period after the switch time.

19. The method of claim 1, further comprising waiting at least a switch time before sending a hello frame to the subscriber station on the 60 GHz channel, wherein the switch time is a predefined time period for switching to occur.

20. The method of claim 1, further comprising waiting a switch time, a probe time, and a backoff time before communicating with an access point (AP).

21. The method of claim 1, further comprising sending a physical layer (PHY) signal when a bad connection is detected with the wireless device.

22. A method for switching between channels on different bands, the method comprising:
communicating with a wireless device on a base channel;
receiving a channel switch request from the wireless device;
sending an acknowledgment to the wireless device;
sending a channel switch response frame to the wireless device;
receiving an acknowledgment from the wireless device;
switching to a 60 GHz channel for communicating with the wireless device; and
waiting at least a switch time before sending a hello frame to the subscriber station on the 60 GHz channel, wherein the switch time is a predefined time period for switching to occur.

23. The method of claim 22, wherein the wireless device is an access point (AP).

24. The method of claim 22, wherein the wireless device is a subscriber station (STA).

25. The method of claim 22, wherein the method is performed by an access point (AP).

26. The method of claim 22, wherein the method is performed by a subscriber station (STA).

27. The method of claim 22, wherein switching to communicating on the 60 GHz channel is triggered by an access point (AP).

28. The method of claim 22, wherein switching to communicating on the 60 GHz channel is triggered by a subscriber station (STA).

29. The method of claim 22, further comprising switching back to the base channel if the 60 GHz channel fails.

30. The method of claim 22, further comprising switching back to the base channel based on physical layer (PHY) metrics of the 60 GHz channel.

31. The method of claim 22, further comprising switching back to the base channel if a successful frame exchange has not occurred on the 60 GHz channel within a predefined window.

32. The method of claim 22, further comprising sending data to the wireless device on the 60 GHz channel.

33. The method of claim 22, wherein the base channel is an 802.11 WLAN operating at 2.4 GHz.

34. The method of claim 22, wherein the base channel is an 802.11 WLAN operating at 5 GHz.

35. The method of claim 22, wherein the channel switch request comprises a tunneled direct link setup (TDLS) channel switch response.

36. The method of claim 22, wherein the channel switch request comprises a very high throughput (VHT) channel switch request.

37. The method of claim 22, further comprising receiving data from the wireless device on the 60 GHz channel.

38. The method of claim 22, further comprising switching back to communicating with the wireless device on the base channel if a continuation frame is received from the wireless device on the base channel.

39. The method of claim 22, further comprising sending a physical layer (PHY) signal when a bad connection is detected with the wireless device.

40. An apparatus configured to switch between channels on different bands in a wireless communications system, the apparatus comprising:
　a processor; and
　circuitry coupled to the processor, the circuitry configured to:
　　communicate with a wireless device on a base channel, wherein the apparatus is a subscriber station (STA);
　　send a channel switch request to the wireless device;
　　receive an acknowledgment from the wireless device;
　　sending a test frame on a 60 GHz channel to determine channel characteristics of the 60 GHz channel before switching to the 60 GHz channel; and
　　switch to the 60 GHz channel for communicating with the wireless device.

41. The apparatus of claim 40, wherein the wireless device is an access point (AP).

42. The apparatus of claim 40, wherein the wireless device is a subscriber station (STA).

43. An apparatus configured to switch between channels on different bands in a wireless communications system, the apparatus comprising:
　a processor; and
　circuitry coupled to the processor configured to:
　　communicate with a wireless device on a base channel;
　　receive a channel switch request from the wireless device;
　　send an acknowledgment to the wireless device;
　　send a channel switch response frame to the wireless device;
　　receive an acknowledgment from the wireless device;
　　switch to a 60 GHz channel for communicating with the wireless device; and
　　waiting at least a switch time before sending a hello frame to the subscriber station on the 60 GHz channel, wherein the switch time is a predefined time period for switching to occur.

44. The apparatus of claim 43, wherein the wireless device is an access point (AP).

45. The apparatus of claim 43, wherein the wireless device is a subscriber station (STA).

46. The apparatus of claim 43, wherein the apparatus is an access point (AP).

47. The apparatus of claim 43, wherein the apparatus is a subscriber station (STA).

48. An apparatus configured to switch between channels on different bands in a wireless communications system, comprising:
　means for communicating with a wireless device on a base channel, wherein the apparatus is a subscriber station (STA);
　means for sending a channel switch request to the wireless device;
　means for receiving an acknowledgment from the wireless device;
　means for sending a test frame on a 60 GHz channel to determine channel characteristics of the 60 GHz channel before switching to the 60 GHz channel; and
　means for switching to the 60 GHz channel for communicating with the wireless device.

49. The apparatus of claim 48, wherein the channel switch request comprises a tunneled direct link setup (TDLS) channel switch response.

50. The apparatus of claim 48, further comprising means for waiting at least a switch time before sending a hello frame to the subscriber station on the 60 GHz channel, wherein the switch time is a time period for switching to occur.

51. An apparatus configured to switch between channels on different bands in a wireless communications system, comprising:
　means for communicating with a wireless device on a base channel;
　means for receiving a channel switch request from the wireless device;
　means for sending an acknowledgment to the wireless device;
　means for sending a channel switch response frame to the wireless device;
　means for receiving an acknowledgment from the wireless device;
　means for switching to a 60 GHz channel for communicating with the wireless device; and
　means for waiting at least a switch time before sending a hello frame to the subscriber station on the 60 GHz channel, wherein the switch time is a predefined time period for switching to occur.

52. The apparatus of claim 51, wherein switching to communicating on the 60 GHz channel is triggered by an access point (AP).

53. The apparatus of claim 51, wherein switching to communicating on the 60 GHz channel is triggered by a subscriber station (STA).

54. A computer-program product for switching between channels on different bands in a wireless communications system, the computer-program product comprising a non-transitory computer-readable medium having instructions thereon, the instructions comprising:

code for communicating, by a subscriber station (STA), with a wireless device on a base channel;

code for sending a channel switch request to the wireless device;

code for receiving an acknowledgment from the wireless device;

code for sending a test frame on a 60 GHz channel to determine channel characteristics of the 60 GHz channel before switching to the 60 GHz channel; and code for switching to the 60 GHz channel for communicating with the wireless device.

55. The computer-program product of claim 54, wherein the channel switch request comprises a tunneled direct link setup (TDLS) channel switch response.

56. The computer-program product of claim 54, further comprising means for waiting at least a switch time before sending a hello frame to the subscriber station on the 60 GHz channel, wherein the switch time is a time period for switching to occur.

57. A computer-program product for switching between channels on different bands in a wireless communications system, the computer-program product comprising a non-transitory computer-readable medium having instructions thereon, the instructions comprising:

code for communicating with a wireless device on a base channel;

code for receiving a channel switch request from the wireless device;

code for sending an acknowledgment to the wireless device;

code for sending a channel switch response frame to the wireless device;

code for receiving an acknowledgment from the wireless device;

code for switching to a 60 GHz channel for communicating with the wireless device; and code for waiting at least a switch time before sending a hello frame to the subscriber station on the 60 GHz channel, wherein the switch time is a predefined time period for switching to occur.

58. The computer-program product of claim 57, wherein switching to communicating on the 60 GHz channel is triggered by an access point (AP).

59. The computer-program product of claim 57, wherein switching to communicating on the 60 GHz channel is triggered by a subscriber station (STA).

60. A method for testing a 60 GHz band, the method comprising:

communicating with a wireless device on a base channel;

sending a signal indicating a power save mode;

switching to a 60 GHz channel; and sending a test signal to the wireless device.

61. The method of claim 60, wherein the wireless device is an access point (AP).

62. The method of claim 60, wherein the test signal uses a robust physical layer (PHY) mode.

63. A method for switching between channels on different bands, the method comprising:

communicating with a wireless device on a 60 GHz channel over a direct link;

switching to a base channel in response to losing communication on the 60 GHz channel; and sending a continuation frame to the wireless device.

64. The method of claim 63, wherein the switching is based on performance metrics of the 60 GHz channel.

65. The method of claim 63, wherein the communication is continued on the base channel.

66. An apparatus for testing a 60 GHz band, the apparatus comprising:

means for communicating with a wireless device on a base channel;

means for sending a signal indicating a power save mode;

means for switching to a 60 GHz channel; and means for sending a test signal to the wireless device.

67. The apparatus of claim 66, wherein the wireless device is an access point (AP).

68. The method of claim 66, wherein the test signal uses a robust physical layer (PHY) mode.

69. A computer-program product for testing a 60 GHz band, the computer-program product comprising a non-transitory computer-readable medium having instructions thereon, the instructions comprising:

code for communicating with a wireless device on a base channel;

code for sending a signal indicating a power save mode;

code for switching to a 60 GHz channel; and code for sending a test signal to the wireless device.

70. The computer-program product of claim 69, wherein the wireless device is an access point (AP).

71. The computer-program product of claim 69, wherein the test signal uses a robust physical layer (PHY) mode.

* * * * *